United States Patent [19]

Yoshino et al.

[11] 3,875,008

[45] Apr. 1, 1975

[54] HOLLOW FILAMENT CONTAINING ENZYMES AND/OR MICROORGANISMS

[75] Inventors: Masatsugu Yoshino, Tokyo; Yasuo Hashino, Matsudo; Masataka Morishita, Shizuoka, all of Japan

[73] Assignee: Asahi Kasei Kogyo Kabushiki Kaisha, Osaka, Japan

[22] Filed: July 31, 1973

[21] Appl. No.: 384,385

[30] Foreign Application Priority Data
Aug. 4, 1972 Japan.............................. 47-77680

[52] U.S. Cl...................... 195/63, 195/59, 195/68, 195/DIG. 11
[51] Int. Cl............................. C07g 7/02, C12k 1/00
[58] Field of Search .......... 195/63, 68, DIG. 11, 59; 264/4, 41, 49, 176 F, 178 F, 194, 209

[56] References Cited
UNITED STATES PATENTS 3,082,057 3/1963 Walker .............................. 264/193
3,674,628 7/1972 Fabre................................. 264/209
3,715,277 2/1973 Danelli et al. ........................ 195/63

*Primary Examiner*—David M. Naff
*Attorney, Agent, or Firm*—Flynn & Frishauf

[57] ABSTRACT

Enzymes and/or microorganisms are encapsulated in a hollow filament by a process involving extruding a solution of polymer through an annular orifice into a coagulation bath while at the same time injecting a solution or suspension of an enzyme and/or a microorganism through the internal portion of the orifice into the hollow space of the filament being formed by the annular orifice. The wall of the resultant filament is a semi-permeable gel and the filament is highly active for reaction of substrates with the enzyme and/or microorganism.

4 Claims, No Drawings

HOLLOW FILAMENT CONTAINING ENZYMES AND/OR MICROORGANISMS

FIELD OF THE INVENTION

This invention relates to a method for fixing enzyme or microorganism. More particularly, this invention relates to a novel hollow filament encapsulating therein an enzyme, microorganism or both and a process for producing the same.

BACKGROUND OF THE INVENTION

In recent years, a fixed enzyme has been found to be advantageous in various applications, particularly continuous industrial operations. One of the advantages is that there is no need to remove the enzyme out of the reaction system after completion of the reaction, because the enzyme fixed in solid state may be handled as solid, as different from the case of an aqueous enzyme solution. Thus, continuous reactions by means of columns are rendered possible when a fixed enzyme is used. Furthermore, in chemical reactions which make use of a microorganism, a microorganism fixed on a support for use as a living catalyst may be used advantageously without leakage of microorganism into the reaction mixture, thereby subsequent purification steps being simplified.

There have heretofore been known various methods for fixing an enzyme or microorganism for use as living catalysts. For fixing an enzyme, the methods as enumerated in the following are known:

1. Covalent bond method, wherein a covalent bond is formed between an enzyme and a fixing support;
2. Ionic bond method, wherein an enzyme protein is adsorbed ionically at its isoelectric point on a support having ionic exchange groups;
3. Physical adsorption method, wherein an enzyme is adsorbed on such a support as active charcoal, kaolinite, etc.;
4. Cross-linking method, wherein an enzyme is fixed by crosslinking the enzyme protein by the use of a reagent having two or more functional groups;
5. Lattice-type enclosing method, wherein an enzyme is enclosed in minute lattices of a gel such as a polyacrylamide gel; and
6. Microcapsule method, wherein an enzyme is coated with a semi-permeable polymer film.

On the other hand, for fixing a microorganism, such methods as (1) Ionic bond method, (2) Lattice-type enclosing method, and (3) Microorganism surface treating method, have been used.

Any one of the methods of prior art as mentioned above, however, cannot be applicable for all species of enzymes or microorganisms. In other words, in most cases, one method is only applicable for a certain specific enzyme or microorganism but not for another enzyme or microorganism. For example, in covalent method or cross-linking method for fixing an enzyme, bonding strength between enzyme and support is very high. But these methods involve a drawback that no product with high activity can be obtained, because active centers of enzyme protein are destroyed to cause variation in high order structure of enzyme protein by the fixing treatment which is conducted under comparatively severe conditions. In these methods, substrate specificity is sometimes changed. On the other hand, in such methods as ionic bond method or physical adsorption method, bonding strength between enzyme and support is very weak, so that the enzyme is liable to be separated from the support. Furthermore, support to be employed is very limited in species. Other methods, i.e. lattice-type enclosing method or microcapsule method, involve drawbacks in difficulty of preparation, and, in addition thereto, in permeability of substrate through gels or wall films, although the enzyme itself is not inactivated in these methods.

SUMMARY OF THE INVENTION

The present invention provides a novel method for encapsulating an enzyme, microorganism or both in a polymeric material. It has now been found that water-containing gels of a polymer having properties of a semi-permeable membrane are excellent as wall films in permeability of water and substrate. It is also found that for encapsulating an enzyme, microorganism or both under mild conditions, namely, in state of a solution or a suspension, into hollow spaces in hollow filaments, spinning-in-water method is particularly advantageous for preparation of said hollow filament, and that hollow filaments thus prepared are very active as living catalysts.

In the present invention, the term "encapsulation" means that an enzyme or microorganism is present fixed in hollow spaces of hollow filaments. The terminal ends of hollow filaments encapsulating an enzyme or microorganism may either be open or closed. As the hollow filaments used in the present invention are very thin, an enzyme or microorganism encapsulated therein remains fixed even if the terminal ends thereof are opened.

The method according to the present invention has the following characteristics:

1. A wide range of enzyme and microorganism are encapsulated in state of a solution or a suspension into hollow spaces of hollow filaments to provide solid living catalysts;
2. Activity remains unaltered during encapsulation, since it is conducted under no such conditions as heating, change of pH or severe reaction conditions which deactivate an enzyme or microorganism;
3. The encapsulated hollow filaments are highly reactive as solid living catalysts, as high polymeric gel films excellent in water permeability as well as substrate permeability are used as wall films;
4. The encapsulated hollow filaments provide a large area for substrate to permeate through, thereby allowing a large capacity as solid living catalyst, and they cause no clogging when used continuously packed in a column;
5. The enzyme solution or microorganism suspension encapsulated in hollow filaments need not be pure, depending on the purpose of their uses, but may also contain two or more species of enzyme, microorganism or both to form a complex reaction system; and
6. The process is very simple with very short production time, and hence the production cost is very low.

The enzyme or microorganism to be used in the present invention is used in the form of a solution or a suspension. For example, an enzyme is dissolved in water, alcohol, acetone or a suitable buffer solution, and a microorganism is suspended in water, alcohol, or a suitable buffer solution. The enzyme or microorganism which may be used in the present invention are not limited in species. Furthermore, two or more species of enzyme and/or microorganism may also be used in combination.

The enzyme to be encapsulated in the hollow filament according to the present invention may be, for example, penicillin acylase type enzyme, racemase, esterase, glucose isomerase and the like. The microorganism to be used in the present invention may be any species, including, for example, cyan-utilizing microorganism, penicilin acylase producing microorganism, macrolide type antibiotic producig microorganism and the like.

As the polymer which forms the hollow filaments, any polymer may be available so long as it is capable of forming semi-permeable gel films excellent in substrate permeability when it is spun into water and producing, hollow filaments which can endure the pressure employed. The polymers which are preferably used may include polyacrylonitrile; polymethacrylonitrile; cellulose derivatives such as cellulose acetate, cellulose acetate phthalate, hydroxypropyl methyl cellulose phthalate, hydroxypropylmethyl cellulose trimellitate, nitro cellulose or ethyl cellulose; vinyl chloride-vinyl acetate copolymer; polyurethane; polysulfone; and copolymers containing these polymers as principal components.

As apparently seen in the Examples set forth below, when polyacrylonitrile or copolymers thereof are used as wall films, highest degree of activity is maintained.

The organic solvents used for preparation of a spinning dope should have an excellent property for dissolving the polymer as well as an excellent miscibility with water. The solvent is suitably selected according to the polymer to be dissolved. Generally, however, N,N-dimethyl formamide, N,N-dimethyl acetamide, dimethyl sulfoxide, formamide, a concentrated aqueous solution of Rhodan salts, and the like are used.

As clearly seen from the results in Examples 19 to 22, the degree of activity maintenance is highest when dimethyl sulfoxide is used as the solvent.

The water permeability of the hollow filament is preferably as large as possible. If it is less than 0.1 ml/cm$^2$.min.atm., hollow filament is extremely decreased in practical value. The internal and external diameters are preferably as small as possible, since surface area is increased as the decrease in diameters. But a hollow filament with an internal diameter of 0.06 mm or less is technically very difficult to be manufactured, whereas a hollow filament with an internal diameter of 1.5 mm or more is difficult in handing as the whole hollow filament becomes bulky and difficult to be packed in a column.

Therefore, a hollow filament having an external diameter of from 0.1 mm to 1.5 mm and an internal diameter of from 0.06 mm to 1.3 mm is preferably used in the present invention.

The hollow filament according to the present invention is prepared by the procedure as described below.

A polymer which constitutes hollow filament is dissolved in a solvent as described above at a suitable concentration, for example, from 10 to 20 % by weight. After dissolving the polymer with stirring, the solution is sufficiently defoamed and filtered. Then, the solution is extruded through the annular space of a double orifice into a coagulation bath to obtain a hollow filament. As a coagulation bath, a water bath is suitable. At the time of the above extrusion, an aqueous solution or suspension of enzyme, microorganism or both is injected through the internal portion of the orifice to obtain hollow filaments encapsulating therein enzyme, microorganism or both.

The semi-permeable gel which forms the wall film of the hollow filament of the present invention cointains pores with an average size small enough to enclose enzyme or microorganism and with a water content of 50 % (V/V) or more. That is, said average size of pores may be 0.5$\mu$ or less.

The measurement of water permeability is conducted according to the following method:

A piece of hollow filament is cut into 40 cm long, pieces washed thoroughly with water to remove completely the enzyme, microorganism or both encapsulated therein. Then, an outer jacket is mounted around the hollow filament, whereby the sealed portions are consolidated with epoxy type adhesives so that they may endure the pressure to be imposed on the outside of the hollow filament. Distilled water is filled in the jacket and a differential pressure of 1 atm. is imposed between the flow-in side (jacket) and the flow-out side (inside of the hollow filament), whereby the amount of water permeability per unit time is measured. The value per unit area is calculated by dividing the measurement value by the effective area of membrane which is calculated from the internal diameter of the hollow filament.

EXAMPLE 1

A polyacrylonitrile having an intrinsic viscosity of 1.2 (in N,N-dimethyl formamide) was dissolved in dimethyl sulfoxide to the concentration of 15 g/100 ml, then the solution was filtered and defoamed. This polymer solution was extruded through the external portion of a double orifice, while a dispersion, wherein 1 % (W/V) active charcoal is dispersed homogeneously in a tris-buffer liquid (0.05 M; pH 7.0) dissolving 10 % (W/V) urease of jack bean(product of Merck Co.), is extruded through the internal portion of said orifice. The whole extruded product was coagulated in a water bath. The double orifice used was spinning nozzle having an external orifice diameter of 0.80mm and an annular slit width of 0.1 mm.

The hollow filament obtained, which encapsulated urease and active charcoal therein, had an external diameter of 0.20 mm and an internal diameter of 0.18mm. The hollow filament was closed by knotting the ends and made into a unit with a length of about 20 cm. The units of hollow filaments were then packed in a column of 2 cm diameter and 10 cm height very carefully so that the hollow filaments might not be cut. A phosphoric acid buffer liquid (0.05M; pH 5.5) containing 1 % urea was passed from the upper of the column. Urea, passing through the walls of the hollow filaments, was decomposed by urease contained therein to produce ammonia which was adsorbed on the co-existing active charcoal.

The percentage of the decomposition of urea was determined, by measuring the concentration of unaltered urea by microdiffusion analysis, to be 75 %. The water permeability of this hollow filament was 2 ml/cm$^2$.min.atm.

EXAMPLE 2

A cellulose diacetate having an intrinsic viscosity of 2.3 (in acetone) was dissolved in N,N-dimethyl formamide to the concentration of 10 g/100 ml, then the solution was filtered and defoamed. This polymer solution was extruded through the external portion of the same double orifice as used in Example 1, while a solution, wherein lipase MY(product of Meito Sangyo Co.) was dissolved in a phosphoric acid buffer liquid (0.02 N; pH 7.0) to the concentration of 15 %, was extruded through the internal portion of said double orifice. The whole extruded product was coagulated in a water bath.

The hollow filament obtained which encapsulated lipase therein had an external diameter of 0.30 mm and an internal diameter of 0.25 mm. The percentage of ester hydrolysis of para-nitro phenyl butyrate by the use of the hollow filament obtained containing lipase was 60 %. The hollow filament had a water permeability of 1 ml/cm$^2$.min.atm.

EXAMPLE 3

A polyacrylonitrile copolymer containing 1 mole % methyl acrylate and having an intrinsic viscosity of 1.5(in N,N-dimethyl formamide) was dissolved in dimethyl sulfoxide to the concentration of 10 g/100 ml, then the solution was filtered and defoamed. This polymer solution was extruded through the external portion of the same double orifice as used in Example 1, while, through the internal portion thereof, a dispersion dispersing homogeneously therein *Fusarium solani* (FERM No. 217 deposited at Fermentation Research Instutute, Agency of Industrial Science and Technology, Japan) to the concentration of 20 % was extruded. The whole product was coagulated in water bath. The hollow filament obtained which encapsulated therein dispersion of Fusarium solani had an external diameter of 0.25 mm and an internal diameter of 0.20 mm.

This hollow filament was closed by knotting the ends to be made into a unit with a length of 25 cm. Ten units of this hollow filament were packed in a column of 1 cm diameter and 20 cm length. From the one end of this column, a cyan-containing liquid(50 ppm CN) was passed at a flowing velocity of 10 ml/hour, whereby a liquid containing substantially no cyan(less than 1 ppm CN) was obtained at the other end of the column. The water permeability of this hollow filament was 4 ml/cm$^2$.min.atm.

EXAMPLES 4 to 18

Various kinds of polymers were dissolved in dimethyl sulfoxide to the concentration of 15 g/100 ml. According to the same procedure as described in Example 3, various hollow filaments encapsulating therein *Fusarium solani* were obtained by the use of these polymer solutions. The material of each hollow filament, the solvent used for molding thereof, dimensions of the hollow filaments obtained and degree of water permeability thereof are shown in Table 1. The hollow filament of each sample was closed by knotting the ends to be made into units with length of 40 cm. Thirty units of the hollow filament were packed in a column of 2 cm diameter and 30 cm length. the same cyan-containing liquid as used in Example 3 was passed through the column under the same conditions as described in Example 3. The results are also listed in Table 1.

Table 1

| Example No. | Material* | Solvent** | Dimensions of hollow filaments Internal diameter(mm) | External diameter(mm) | Water permeability (ml/cm$^2$.min.atm) | Flowing velocity (ml/hr) | CN conc. (ppm) Flow-in | Flow-out |
|---|---|---|---|---|---|---|---|---|
| 4 | PMAN | DMSO | 0.8 | 0.6 | 2 | 10 | 50 | 0.5 |
| 5 | AN-MA(1) | DMSO | 0.8 | 0.6 | 5 | 10 | 50 | 0.01> |
| 6 | PAN | DMSO | 0.8 | 0.6 | 2 | 10 | 50 | 0.01> |
| 7 | PAN | DMF | 0.8 | 0.6 | 2 | 10 | 50 | 0.1 |
| 8 | CAP | DMSO | 0.8 | 0.6 | 3 | 10 | 50 | 0.1 |
| 9 | HPMCT | DMSO | 0.8 | 0.6 | 1 | 10 | 50 | 0.1 |
| 10 | PVC-VA | DMSO | 0.8 | 0.6 | 1 | 10 | 50 | 0.1 |
| 11 | CDA | DMSO | 0.8 | 0.6 | 1 | 10 | 50 | 0.2 |
| 12 | CDA | DMA | 0.8 | 0.6 | 0.2 | 10 | 50 | 5 |
| 13 | CDA | Acetone | 0.8 | 0.6 | 0.1 | 10 | 50 | 12 |
| 14 | AN-MA(2) | DMSO | 1.5 | 1.3 | 5 | 10 | 50 | 0.1 |
| 15 | AN-MA(2) | DMSO | 0.9 | 0.6 | 6 | 10 | 50 | 0.01> |
| 16 | AN-MA(2) | DMSO | 0.5 | 0.4 | 8 | 10 | 50 | 0.01> |
| 17 | AN-MA(2) | DMSO | 0.2 | 0.1 | 11 | 10 | 50 | 0.01> |
| 18 | AN-MA(2) | DMSO | 0.1 | 0.06 | 13 | 10 | 50 | 0.01> |

*) PMAN=polymethacrylonitrile; AN-MA(1)=acrylonitrile-methyl acrylate copolymer(90:10, molar ratio); PAN=polyacrylonitrile; CAP=cellulose acetate phthalate; HPMCT=hydroxypropyl methyl cellulose trimellitate; PVC-VA=vinyl chloride-vinyl acetate copolymer(72:28, molar ratio); CDA=cellulose diacetate; AN-MA(2)=acrylonitrile-methyl acrylate copolymer (92:8, molar ratio)
**) DMSO=dimethyl sulfoxide; DMF=N,N-dimethyl formamide; DMA=N,N-dimethyl acetamide

EXAMPLES 19 to 22

A polyacrylonitrile having an intrinsic viscosity of 1.2 (in N,N-dimethyl formamide) was dissolved in various kinds of solvents to the concentration of 15 g/100 ml. According to the same procedure as described in Example 2, hollow filaments encapsulating therein lipase were prepared by the use of these polymer solutions. The solvents used for molding each filament, the dimensions of the hollow filament obtained and water permeability thereof are shown in Table 2. The hollow filament of each sample was closed by knotting the ends to be made into units each with a length of 40 cm. Thirty units of each hollow filament were packed in a column of 2 cm diameter and 30 cm length. From the one end of the column, 1 % aqueous para-nitro phenyl butyrate solution was passed at a flowing velocity of 10 ml/hour through the column, whereby the percentage of ester hydrolysis was measured. The results are as shown in Table 2, which clearly shows that the hollow filament having the highest of activity maintenance was obtained when dimethyl sulfoxide is used as the polymer solvent.

Table 2

| Example No. | Solvent | Dimensions of hollow filaments Internal diameter(mm) | External diameter(mm) | Water permeability (ml/cm².min.atm.) | Ester hydrolysis (%) |
| --- | --- | --- | --- | --- | --- |
| 19 | Dimethyl sulfoxide | 0.8 | 0.6 | 2 | 96 |
| 20 | N,N-dimethyl formamide | 0.8 | 0.6 | 2 | 62 |
| 21 | N,N-dimethyl acetamide | 0.8 | 0.6 | 2 | 65 |
| 22 | Sodium thiocyanate (48% aqueous solution) | 0.8 | 0.6 | 1 | 60 |

EXAMPLE 23

Twenty (20) liters of a liquid culture medium (pH=7.0) containing 0.5 % glucose, 0.3 % glycerine, 1.0 % meat extract and 1.0 % polypeptone were charged into a jar fermenter with a capacity of 30 liters, and subjected to steam sterilization at 120°C for 20 minutes. In this culture was inoculated aseptically 200 ml seed liquid culture of *Bacillus megaterium* B-400(FERM-P 748, deposited at Fermentation Research Institute, Agency of Industrial Science and Technology, Japan) which had been cultured in the same culture medium as described above 30°C for 24 hours. Culturing was conducted by stirring at 300 r.p.m. the culture liquid under aeration of 20 liter/minute at 30°C for 72 hours. A culture liquid, wherein the objective enzyme was formed at interior or exterior of the bacteria, was obtained.

A polyacrylonitrile solution dissolved in dimethyl sulfoxide (15g/100 ml) was extruded through the external slit of a double orifice, while the thus prepared culture liquid of *Bacillus megaterium* B-400 was extruded through the internal portion of said orifice. The entire extruded product was coagulated in a water bath. The hollow filament encapsulating therein *Bacillus megaterium* B-400, which was obtained by the use of a double orifice having an internal diameter of 0.8 mm and a slit width of 0.10 mm, had an external diameter of 0.25 mm and an internal diameter of 0.20 mm. The hollow filament was closed by knotting the ends to be made into units with each a length of 25 cm. About thirty units of the hollow filament were packed in a column of 1 cm diameter and 20 cm length. A solution, which had been prepared by dissolving 50 mg of sodium 3-methyl-7-phenylacetamide-$\Delta^3$-cepham-4-carboxylate and 100 mg of hydrochloric acid salt of D-phenyl glycine ethyl ester in 0.1 mol phosphoric acid buffer liquid (pH=7.5), was passed through the column at a flowing velocity of 15 ml/hour from one end of the column, whereby from the other end of said column a solution containing cephalexine was derived with an yield of 12.4 %.

We claim:

1. A hollow filament encapsulating therein a solution or dispersion of an enzyme, a microorganism or both, said hollow filament comprising wall material of a semipermeable gel of a polymer selected from the group consisting of polyacrylonitrile, polymethacrylonitrile, cellulose acetate, cellulose acetate phthalate, hydroxypropyl methyl cellulose phthalate, hydroxypropyl methyl cellulose trimellitate, vinyl chloride-vinyl acetate copolymer, polyurethane, polysulfone and copolymers containing these polymer components, said wall material having a water permeability of at least 0.1 ml/cm².min.atm., and said filament having an external diameter of from about 0.1 mm to about 1.5 mm and an inside diameter of from about 0.06 mm to about 1.3 mm.

2. A process for producing a hollow filament as defined in claim 1, which comprises extruding a solution of the polymer forming the semi-permeable gel into a coagulation bath through a nozzle having an annular orifice and, at the same time, injecting as an internal coagulant a solution or dispersion of enzyme, microorganism or both through the internal portion of said orifice and coaguating the resulting hollow filament in said bath.

3. The process according to claim 2 wherein a buffer liquid is used as medium for the coagulation bath and the internal coagulant.

4. The process according to claim 2 wherein a solvent, selected from the group consisting of dimethyl sulfoxide, N,N-dimethyl formamide, N,N-dimethyl acetamide, formamide, acetone and a concentrated aqueous solution of Rhodan salts, is used as a polymer solvent.

* * * * *